May 16, 1933. A. MOORHOUSE 1,908,996
SHOCK ABSORBER
Filed Dec. 21, 1927
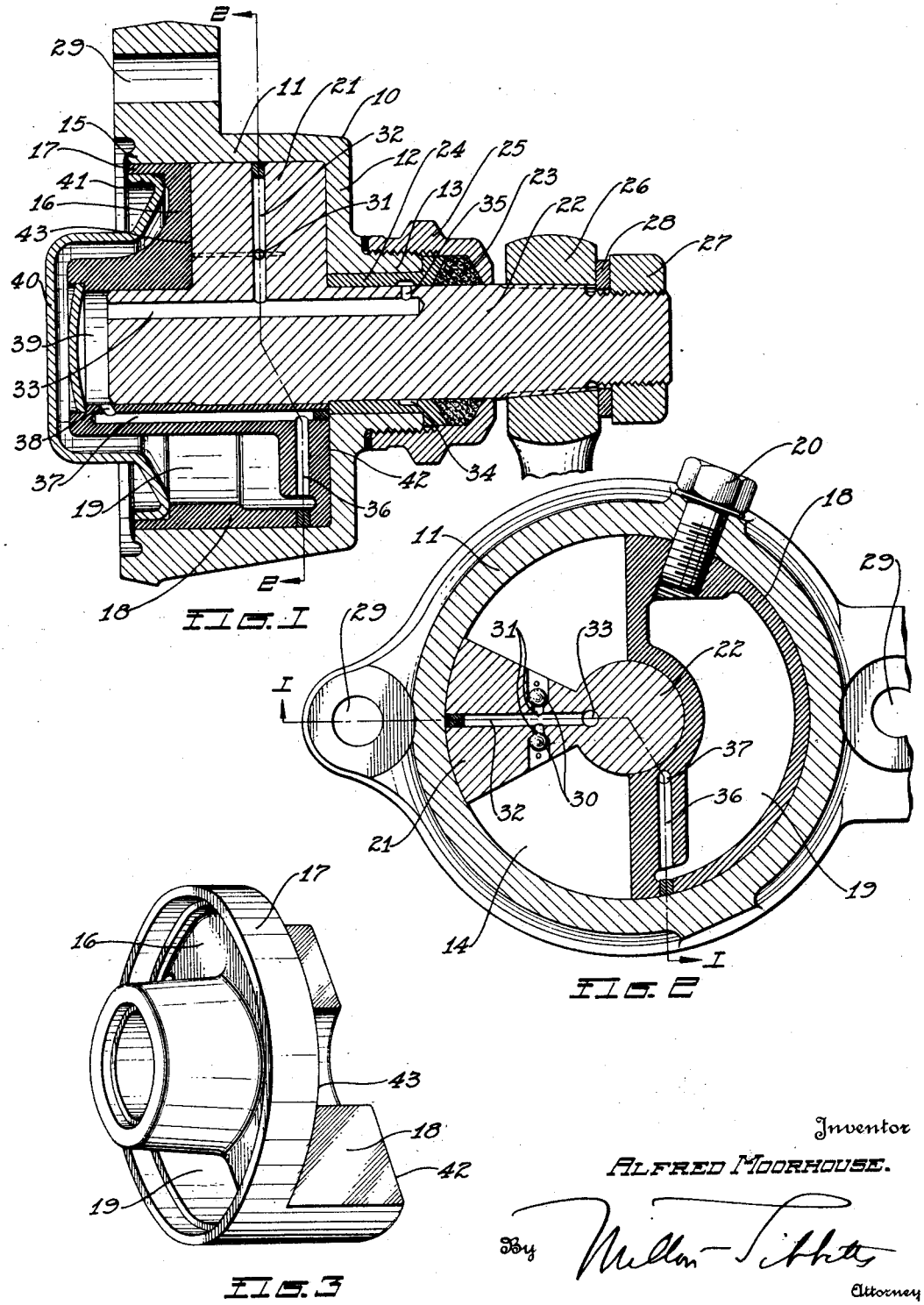
Inventor
ALFRED MOORHOUSE.
By
Attorney Patented May 16, 1933

1,908,996

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

SHOCK ABSORBER

Application filed December 21, 1927. Serial No. 241,665.

This invention relates to motor vehicles and more particularly to shock absorbers of the hydraulic type used on such vehicles between the frame and axle or between other relatively moving parts.

The present invention constitutes an improvement upon the general type of shock absorber disclosed in my co-pending application, Serial No. 226,282, filed October 15, 1927. In that application is disclosed a hydraulic shock absorber, the casing of which is provided with a cover or closure secured in place by a plurality of bolts passing through both the cover and the casing. This or any similar spaced fastening means is not always satisfactory, for excessive or high pressure developed within the casing will cause distortion of the cover between the spaced fastening means, or bending or outward flexing of the cover which will open the joint between the cover and casing or will establish communication from one side of the piston to the other between the cover and the piston.

The very accurate machining required on the cover and casing renders the shock absorber difficult and expensive to produce. For example, to produce a shock absorber of the type disclosed in the co-pending application referred to, it is necessary that the working chamber be of exact width to operatively accommodate the piston without undue friction and without permitting more than the allowable minimum of liquid to pass between the piston and the working chamber walls. Still further, the side wall of the replenishing chamber must abut the end wall of the casing at the same time that the outwardly projecting flange of the cover makes a tight joint with the casing. These requirements can only be met by very accurate machining and association of the parts of the shock absorber and the amount of such machining required will readily be apparent.

It is an object of the present invention to obviate the necessity for much of the very accurate machining heretofore required in the production of hydraulic shock absorbers.

Another object of the present invention is to provide a hydraulic shock absorber having a permanently united sectional casing which is rugged and capable of withstanding high internal pressure without distortion of the cover.

Another object of this invention is to provide an improved construction of shock absorber, in which a fluid-tight joint is obtained without the necessity for the accurate machining operations above referred to, and in which the internal pressure developed within the piston chamber cannot so distort the closure member that there will be leakage or relief pressure between said member and the piston from one side of the piston to the other.

A further object of the invention is to provide a shock absorber in which a closure member is positioned within the end of a chamber formed by a casing, and is welded to the casing in line with the inner surface of the casing.

Another object of the present invention is to provide a hydraulic shock absorber casing, the cover or closure of which is made liquid tight by welding.

Another object of the invention is to simplify the construction and to reduce the cost of production of hydraulic shock absorbers.

Another object of the invention is to provide a hydraulic shock absorber structure in which a casing and cover are welded permanently together with the weld under shearing stress from internal pressure.

Other objects of the invention will appear from the following description taken in connection with the accompanying drawing which forms part of this specification, and in which:

Fig. 1 is a sectional view of a shock absorber embodying my invention, the section being substantially on line 1—1 of Fig. 2;

Fig. 2 is a section through the shock absorber taken substantially on line 2—2 of Fig. 1;

Fig. 3 is a view in perspective of the inner cover of the shock absorber casing.

Referring to the drawing, 10 is the body or casing of the shock absorber having a cylindrical portion 11, an end wall 12 and a bearing portion 13. The cylindrical portion and end wall form a working chamber 14 for the shock absorber and the cylindrical portion 11 is provided with an annular projecting portion 15 for a purpose presently to appear. An inner cover or closure member 16 is inserted in the open end of the casing and is provided with an annular flange 17 adapted to be positioned contiguous to the annular projecting portion 15 of the casing. The cover or closure 16 has a semi-cylindrical extension 18 fitting into the cylindrical portion 11 of the casing, the extension being preferably cored out to form an auxiliary reservoir or reserve tank 19. A filling opening is provided by aligned passages in the casing and extension 18 and is closed by a plug 20. Both the working chamber and reserve tank are substantially filled with any suitable liquid such as oil or glycerine.

A piston 21 mounted to oscillate in the working chamber 14 has a shaft 22 suitably supported in the casing and cover. A packing 23 is compressed against the bearing sleeve 24 by a hollow nut 25 screwed on the bearing portion 13 of the casing. Outwardly of nut 25, shaft 22 is serrated and an arm 26 is mounted upon the serrated portion and held thereon by nut 27 and lock washer 28. The shock absorber is adapted to be mounted upon a suitable support by bolts extending through openings 29 in the casing. Arm 26 is adapted for connection in any suitable manner to a part which moves relatively to the support upon which the absorber is mounted so that the piston will be operated in the working chamber as the vehicle parts move relatively to each other.

Piston 21 is provided with a pair of check valves 30 arranged in passages 31 which communicate with a passage 32 and which in turn connects with a passage 33 in shaft 22. An annular leakage groove 34 is formed in bearing sleeve 24 and a short passage 35 connects this leakage groove with passage 33. Any liquid escaping from the working chamber in the direction of bearing sleeve 24 will be caught in the leakage groove 34 and drawn back into the working chamber through passages 35, 33, 32, and 31 and past one or the other of the check valves 30 by reason of the suction existing on the receding side of the piston. Liquid may be drawn into the working chamber from the lowermost part of the auxiliary reservoir 19 when needed through connected passages 36, 37, 38, 39, 33, 32 and 31 and past one or the other of the check valves 30.

An outer cover in the form of a plate 40 having an annular flange 41 pressed into a cylindrical portion of the inner cover or closure member 16 formed by the annular flange 17 provides an enlargement of reservoir 19. As may be seen in Fig. 1 of the drawing, flange 41 of the outer cover and flange 17 of the inner cover are adapted to be positioned contiguously.

In assembling the shock absorber, after placing the piston in position, the inner cover 16 is inserted into the cylindrical part 11 of casing 10 until the face side wall 42 of the replenishing reservoir abuts end wall 12 of the casing. Side wall 42 of the replenishing reservoir and inner wall 43 of the inner cover 16 are spaced accurately so that with cover 16 in place, the working chamber 14 is of exact width to operatively accommodate piston 21. Outer cover 40 is then pressed into place with flange 41 contiguous to flange 17 of inner cover 16 and both inner and outer covers are welded to the annular projecting portion 15 of the casing. A continuous annular weld is made, as clearly shown in Fig. 1 of the drawing, at the outermost edges of the annular projecting portion 15 and the annular flanges 17 and 41 of the inner and outer covers respectively. The weld is in line with the inner surface of the casing, that is, at the joint between the peripheral surface of the closure member and inner surface of the chamber within which it is fitted, and the weld constitutes a permanent sealing and securing means holding the closure member in place throughout the entire extent and at all points of the annular end surface thereof. By the described arrangement of the closure member and manner of securing the same, it is not possible for the closure member to bend or flex sufficiently for leakage or relief of pressure to occur from one side of the piston to the other between the piston and the face of the closure member. In addition the weld is placed under shearing stress from internal pressure on the cover and thus there is no tendency of pressure to tear the joint apart such as would be the case if the cover overlapped the casing and was welded thereto in a plane extending transversely of the axis of the shaft 22, and further with the nested arrangement and securement of the casing and covers the annular weld is small in diameter which increases the ruggedness of the structure and its ability to withstand high internal pressures.

By welding the covers to the casing, thus providing a unitary casing for the shock absorber, a greater part of the precision machining heretofore necessary in the production of hydraulic shock absorbers is eliminated. No very accurate dimensioning or machining need be done on the casing, and with respect to the inner cover, it is only necessary that the reservoir side wall 42 and inner wall 43 be very accurately spaced so that when the cover is in place in the casing, the working chamber will be of the exact required width. The shock absorber casing is also considerably simplified in construction because of the elimination of the heretofore necessary bolts and bolt holes and the covers are made absolutely liquid tight with the casing.

The unitary casing provides a practical enclosing means for a hydraulic shock absorber because the simplicity of design and low cost of manufacture make it profitable, if repair is necessary to the parts enclosed by the casing, to discard the shock absorber and replace it with a new one. The use of a permanently united casing with the shock absorber disclosed in this and the co-pending application above referred to is particularly advantageous because of the non-adjustability of the parts enclosed within the casing.

The form of invention shown and described is to be considered merely as a preferred one and it is intended that the invention be limited only by the scope of the appended claims.

Having thus described my invention, what I claim and desire to secure by Letters Patent is:

1. In a shock absorber, a casing having an annular open projecting end portion and a plurality of covers for the open casing end portion each having an annular flange telescoping into and welded to the annular projecting portion of the casing in permanently sealed relation.

2. A hydraulic shock absorber having a casing, an inner cover provided with an auxiliary reservoir integral therewith adapted to project into the casing and an outer cover adapted to provide an enlargement for the auxiliary reservoir, said inner and outer covers being welded to the casing in permanently sealed relation.

3. A hydraulic shock absorber having a casing provided with an end wall, a cover for the casing having an auxiliary reservoir integral therewith, said cover being positioned within the casing with a wall of the auxiliary reservoir abutting the end wall of the casing, the cover being welded to the casing in a permanently sealed relation.

4. In a shock absorber, a casing having a piston chamber and an integral end wall, and a closure forming the opposite end wall of the casing, said closure being positioned within and guided by the inner surface of the casing and being welded to the casing in line with the inner surface of the casing, and a piston operable in the casing.

5. In a shock absorber, a casing having a cylindrical portion forming a piston chamber a closure forming an end wall of the casing and positioned within and guided by the inner surface of the casing, said end wall being welded to the casing in line with the inner surface of the casing, and a piston operable in the casing.

6. In a shock absorber, a casing having a cylindrical portion forming a piston chamber and an integral end wall, a closure positioned within the casing and having a portion forming an abutment in the zone of the oscillation of the piston, and said abutment portion of the closure being positioned against said end wall of the casing, said closure forming the opposite end wall of the casing and said closure being welded to the casing in line with the inner wall of the piston portion thereof, and a piston adapted to oscillate in the piston chamber of said casing to and from the abutment arranged therein.

7. In a shock absorber, a casing having a cylindrical portion forming a piston chamber, and a portion having an inner cylindrical surface forming an extension of that part of the casing in which the piston operates, a closure positioned wholly within and having its periphery in contact with the inner cylindrical surface of said extension, said extension and said closure being welded together at the cylindrical joint between them.

8. In a shock absorber, a casing forming a liquid-containing chamber, a piston movable within said chamber, said casing having an integral end wall closing one side of said chamber, a closure member closing the opposite side of said chamber, said closure member being positioned within the end of the chamber of the casing and being welded to the casing in line with the inner surface thereof, and an outer cover welded to the casing and closure member.

9. In a shock absorber, a casing forming a liquid-containing chamber and having an integral end wall closing one side of said chamber, said casing at its opposite side from the end wall having an annular flange or projection, a piston movable within said chamber, and a closure member closing the opposite side of said chamber, said closure member being positioned within the end of the chamber of the casing and having an annular flange the outer edge of which is brought by the positioning of said member into contiguity with the edge of the flange or projection on the casing and welded thereto.

10. In a shock absorber, a casing forming a liquid-containing chamber and having an end wall closing one side of said chamber, a closure member fitting within the end of the chamber of the casing, and having a substantially half-cylindrical abutment portion, the inner face of which abuts against said end wall, and a piston movable within said chamber toward and away from said abutment portion, said casing and closure member having parts brought into contiguous relation by the engagement of said abutment portion with said end wall and welded together in line with the inner surface of said casing.

11. In a shock absorber, a casing having an annular projecting portion providing an opening and a cover for the opening having an annular flange associated interiorly of and adjacent the annular projecting portion of the casing, the ends of said adjacent annular portion and said flange being permanently united and sealed by welding.

12. In a hydraulic shock absorber, a casing open at one end, a piston in the casing, a cover telescoped axially in the casing with an abutment engaging the closed end of the casing, and an outer sealing cover adjacent the inner cover, said covers having adjacent edges welded to the open end of the casing to form a continuous leak proof joint.

In testimony whereof I affix my signature.

ALFRED MOORHOUSE.